(12) United States Patent
Winebrenner et al.

(10) Patent No.: US 6,471,453 B1
(45) Date of Patent: Oct. 29, 2002

(54) BALANCING ASSEMBLY FOR A ROTATING MEMBER

(75) Inventors: John R. Winebrenner, Latrobe; Michael R. McCormick, Greensburg, both of PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/866,221

(22) Filed: May 25, 2001

(51) Int. Cl.$^7$ .............................. B23C 9/00; F16F 15/22
(52) U.S. Cl. ...................... 409/141; 74/573 R; 464/180; 451/343; 408/143
(58) Field of Search .................... 409/141, 234; 408/143, 239 R; 451/343; 464/180; 74/573 R; 279/83

(56) References Cited

U.S. PATENT DOCUMENTS

| | | | |
|---|---|---|---|
| 82,278 A | * | 9/1868 | Benn ........................... 451/343 |
| 525,799 A | | 9/1894 | Rymes |
| 861,463 A | * | 7/1907 | Hyde .......................... 451/343 |
| 966,617 A | * | 8/1910 | Sturdevant .................. 451/343 |
| 1,211,488 A | | 1/1917 | Reed |
| 1,218,689 A | * | 3/1917 | Nichols ....................... 451/343 |
| 1,305,978 A | * | 6/1919 | Spence ........................ 451/343 |
| 1,645,343 A | | 10/1927 | Moorhouse |
| 1,980,693 A | | 11/1934 | Newman et al. |
| 2,097,894 A | * | 11/1937 | Roche .......................... 451/343 |
| 2,241,637 A | | 5/1941 | Ernst et al. |
| 2,641,877 A | | 6/1953 | Anderson |
| 2,861,471 A | | 11/1958 | Kronenberg |
| 3,000,240 A | | 9/1961 | Eckardt |
| 3,528,316 A | | 9/1970 | Hammer |
| 4,294,135 A | | 10/1981 | Tameo |
| 4,626,144 A | | 12/1986 | Berner |
| 4,865,336 A | | 9/1989 | Keritsis |
| 4,951,526 A | | 8/1990 | Linder |
| 5,033,923 A | | 7/1991 | Osawa |
| 5,074,723 A | | 12/1991 | Massa et al. |
| 5,125,188 A | | 6/1992 | Ogawa et al. |
| 5,154,554 A | | 10/1992 | Ariyoshi |
| 5,263,995 A | | 11/1993 | Mogilnicki et al. |
| 5,478,177 A | | 12/1995 | Romi |
| 5,555,144 A | | 9/1996 | Wood et al. |
| 5,746,647 A | * | 5/1998 | Huang ......................... 451/343 |
| 5,810,527 A | | 9/1998 | Jager et al. |
| 5,931,050 A | * | 8/1999 | Roach ........................ 74/573 R |
| 6,135,684 A | | 10/2000 | Senzaki |
| 6,186,712 B1 | * | 2/2001 | Senzaki ....................... 408/143 |
| 6,322,299 B1 | * | 11/2001 | Hartman ...................... 409/141 |

FOREIGN PATENT DOCUMENTS

| | | |
|---|---|---|
| DE | 2134270 | 1/1973 |
| FR | 577044 | 10/1924 |
| SU | 1456797 | 9/1989 |

* cited by examiner

Primary Examiner—A. L. Wellington
Assistant Examiner—Erica E Cadugan
(74) Attorney, Agent, or Firm—Larry R. Meenan

(57) ABSTRACT

Briefly, according to this invention, there is provided a balancing assembly for balancing a rotating member and the combination of a rotating member and balancing assembly. The balancing assembly includes an annular ring, a locking member and a cover. The annular ring has an opening for receiving the rotating member and at least one removable primary balancing weight and at least one removable secondary balancing weight. The locking member secures the annular ring with respect to the rotating member. The cover operatively contains the secondary balancing weight with respect to the annular ring and includes a connecting section for removably coupling the cover to the annular ring.

38 Claims, 5 Drawing Sheets

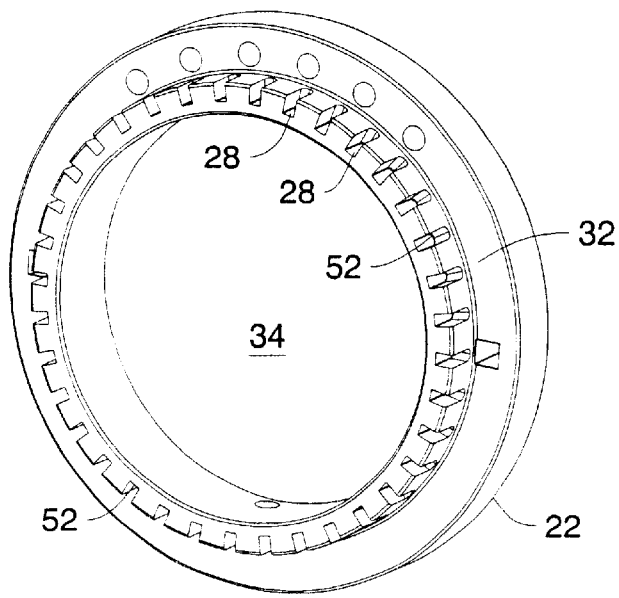
FIG. 4
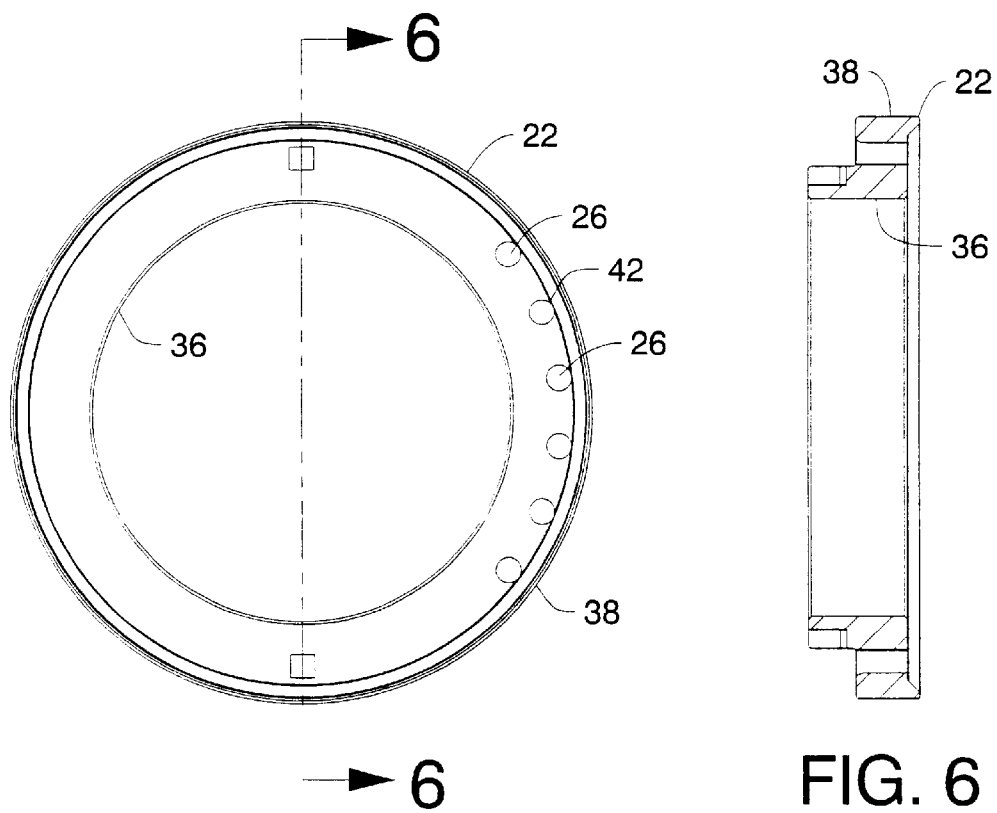
FIG. 5
FIG. 6

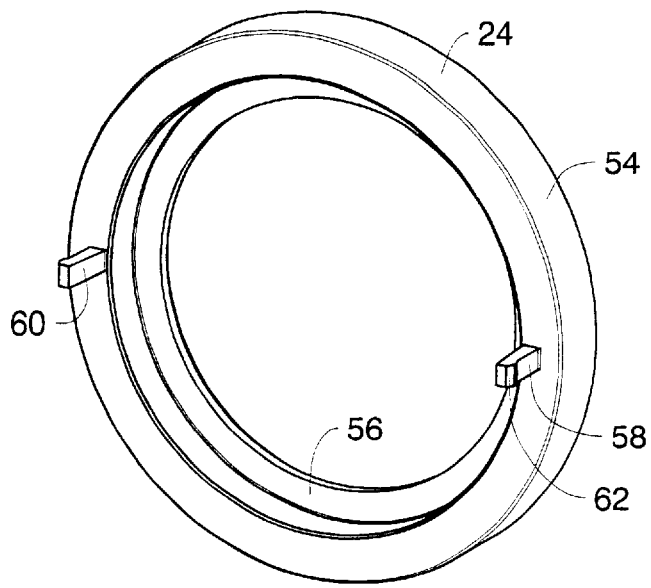
FIG. 7
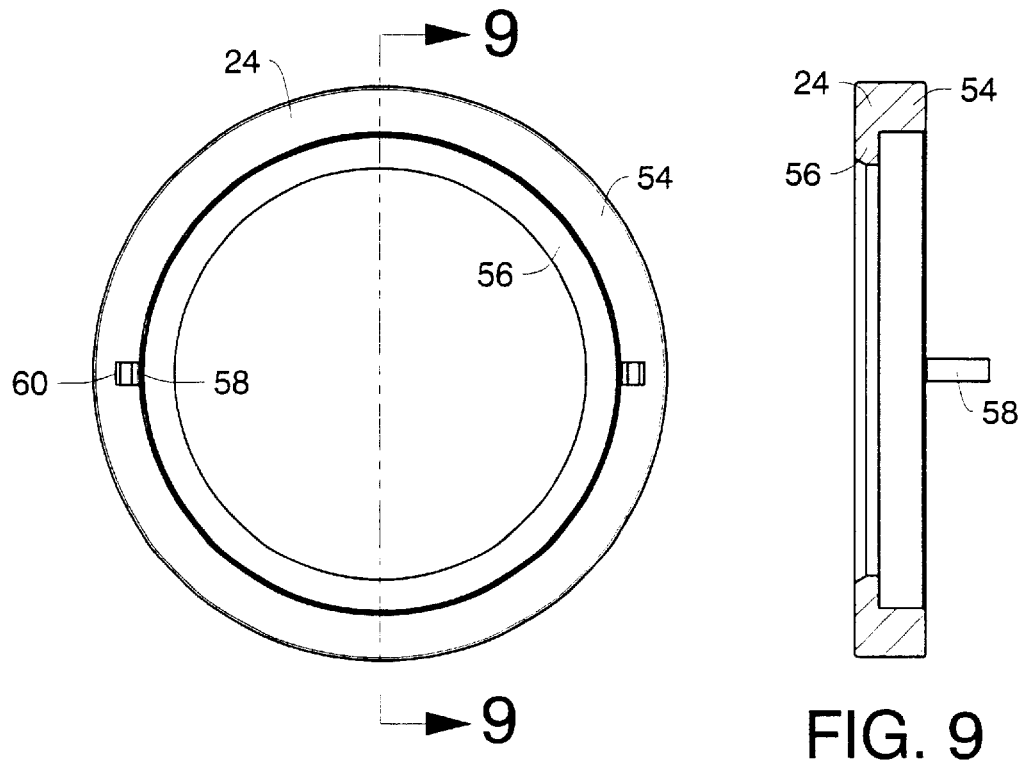
FIG. 8
FIG. 9

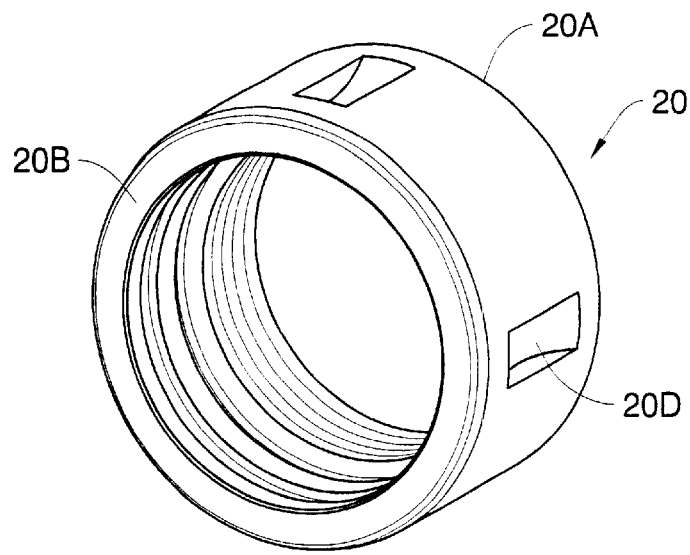
FIG. 10
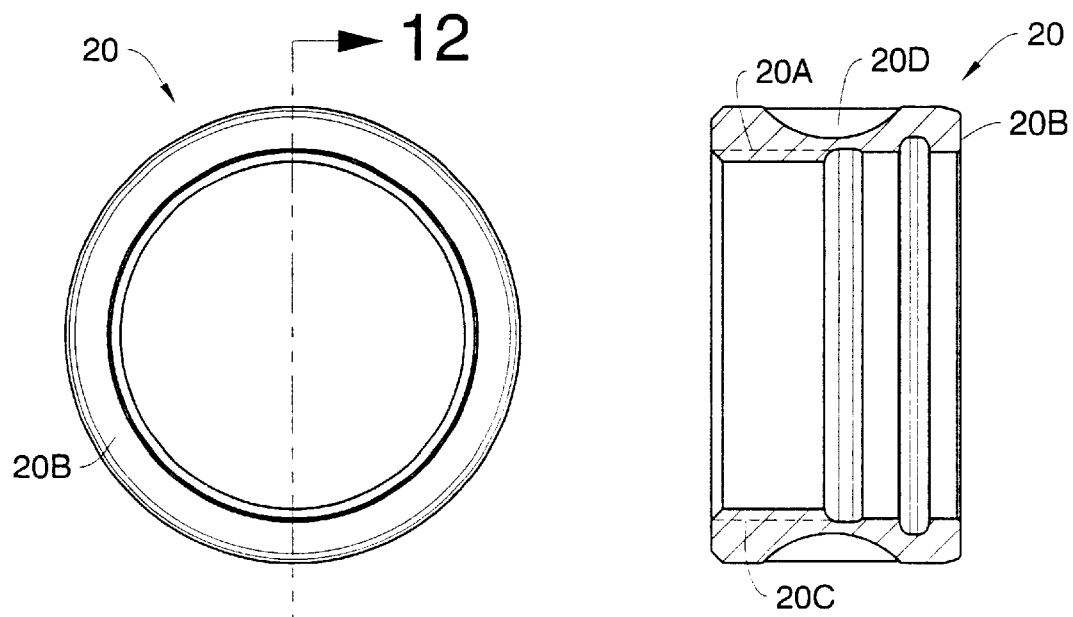
FIG. 11
FIG. 12

BALANCING ASSEMBLY FOR A ROTATING MEMBER

BACKGROUND OF THE INVENTION

1. Field of the Invention

This invention relates to a balancing assembly for a rotating member. More particularly, this invention relates to a balancing assembly for balancing a rotating member such as a tool holder.

2. Description of the Related Art

The balancing of rotating members that rotate at high rates, e.g., 10,000 rpm or higher is very important. If a high speed rotating member is allowed to operate in an unbalanced state this will result in oscillating forces being created by the rotating member due to the centrifugal force effect of the unbalance. In cutting tools, this typically leads to premature bearing wear or failure and machine vibrations which result in uneven cutting action.

To minimize the unbalanced effects on the rotating member, for example the tool holder, the assembly must be accurately balanced. The problem of accurately balancing a rotating member is particularly acute when there is a significant change in the shape or size of the rotating member over time. For example, the tool holder must be rebalanced each time there is a change in tools or when reshaping the same tool. It is not uncommon to find a tool itself out of balance and it is often difficult to precisely place the cutting tool where its axis is exactly aligned with the axis of the rotating tool holder. Due to the frequent need for rebalancing, there is a need for an efficient, integral, adjustable and accurate balancing assembly for such high speed rotating cutting tools.

The object of the present invention is to provide a balancing assembly for a rotating member. Another object of the present invention is to provide a balancing assembly for balancing a rotating member such as a tool holder.

SUMMARY OF THE INVENTION

Briefly, according to this invention, there is provided a balancing assembly for balancing a rotating member. The balancing assembly includes an annular ring, a locking member and a cover. The annular ring has an opening for receiving the rotating member and at least one removable primary balancing weight and at least one removable secondary balancing weight. The locking member secures the annular ring with respect to the rotating member. The cover operatively contains the secondary balancing weight with respect to the annular ring and includes a connecting section for removably coupling the cover to the annular ring.

The combination of a balancing assembly and a rotating member is also disclosed. The rotating member may be most any suitable member that is capable of rotation such as a tool holder, axle, turbine blade, motor, and the like.

BRIEF DESCRIPTION OF THE DRAWINGS

Further features of the present invention, as well as the advantages derived therefrom, will become clear from the following detailed description made with reference to the drawings in which:

FIG. 4 is a perspective view of a balancing assembly of FIG. 3;

FIG. 5 is an end view of the balancing assembly of FIG. 4;

FIG. 6 is a cross sectional view of the balancing assembly of FIG. 5 taken along line 6—6;

FIG. 7 is a perspective view of a cover of the balancing assembly of FIG. 3;

FIG. 8 is an end view of the cover of FIG. 7;

FIG. 9 is a cross sectional view of the cover of FIG. 8 taken along line 9—9;

FIG. 10 is a perspective view of the chuck of FIGS. 1 and 2;

FIG. 11 is an end view of the chuck of FIG. 10; and

FIG. 12 is a cross sectional view of the chuck of FIG. 11 taken along line 12—12.

DESCRIPTION OF THE PREFERRED EMBODIMENT

Figure 1:
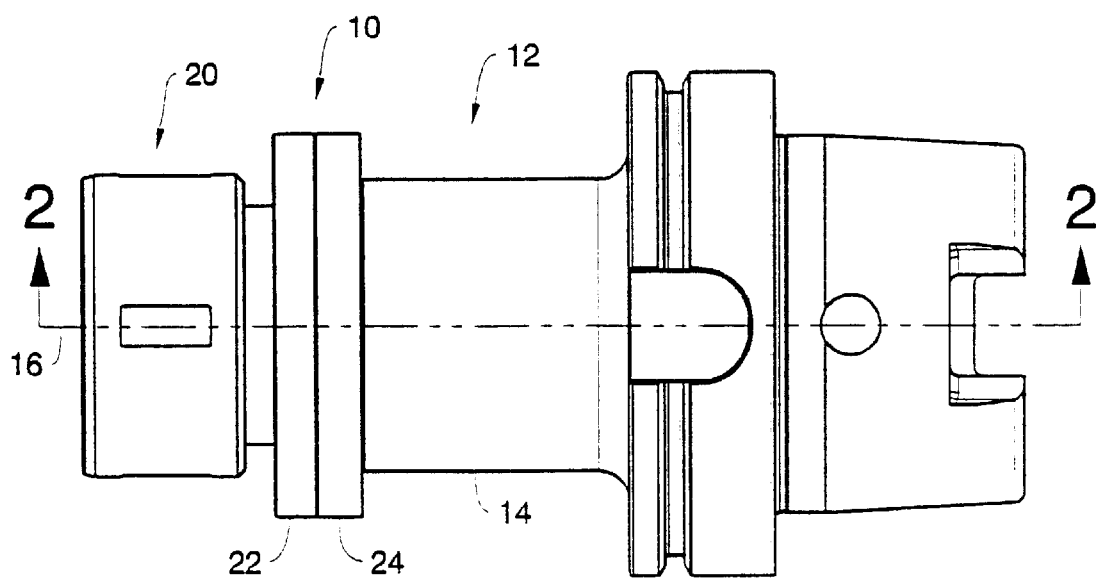
FIG. 1 is a side view of a tool holder.
Figure 2:
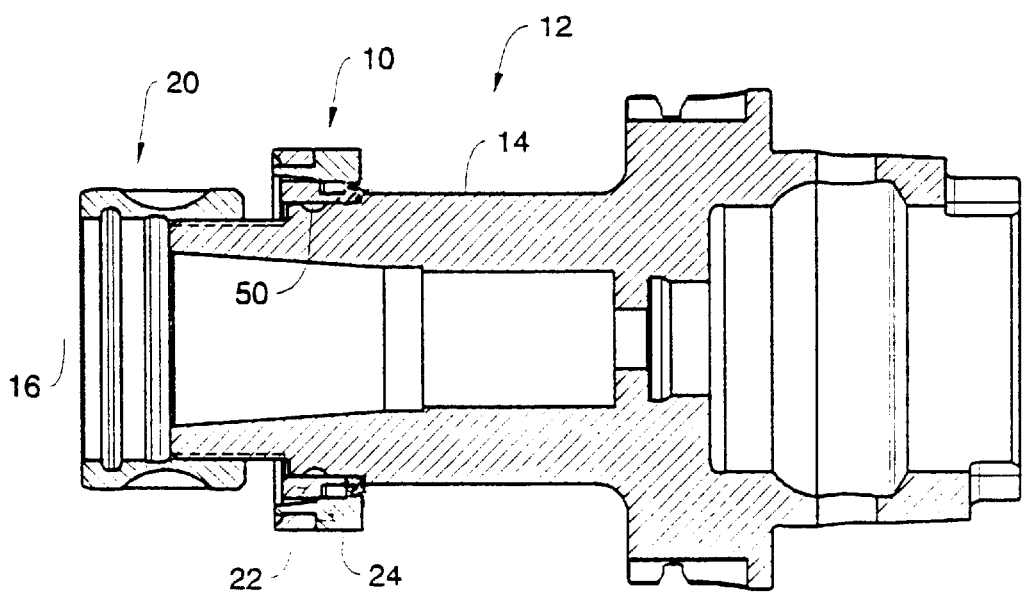
FIG. 2 is a cross-sectional view of the tool holder of FIG. 1 taken along line 2—2.

Referring to the drawings, wherein like reference characters represent like elements, there is shown a balancing assembly 10 in accordance with the present invention for balancing a rotating member 12. It will be appreciated that for purposes of illustrating the balancing assembly 10 of the present invention, the rotating member 12 is shown as a tool holder. The tool holder includes an outer housing 14 and a central axis 16. A collet chuck 18 is provided as part of the outer housing 14 and includes a nose ring 20 which defines an opening within the tool holder for receiving a collet (not shown). The collet is in turn adapted to receive and hold a cutting tool, such as a drill (not shown). As shown in FIGS. 1, and 10–12, the nose ring 20 comprises a generally circular ring which is detachably connectable to the tool holder. The nose ring 20 is tubularly shaped, and includes a lower end 20a and an upper end 20b having screw threads 20c on its inner diameter that engage screw threads present on the outer diameter of the distal end of the tool holder. To facilitate the grip of an operator around the nose ring 20, a plurality of spanner slots or wrench grip recesses 20d are provided in the positions shown.

The balancing assembly 10 of the present invention may be used with equal facility to balance most any suitable member that is capable of rotation such as an axle, turbine blade, motor, and the like and the description of the invention with respect to a tool holder is not to be construed as limitation of the invention except as otherwise claimed.

Referring to the figures, the balancing assembly 10 is illustrated as being rotatively journalled on the rotating member 12 to balance the rotating member. The balancing assembly 10 includes an annular ring 22, a cover 24, at least one removable primary balancing weight 26 and at least one removable secondary balancing weight 28.

The annular ring 22 is of a single unitary construction having a forward face 30 and a rearward face 32. An opening 34 is provided within the annular ring 22 to define an inner circumferential surface 36 and an outer circumferential surface 38. The inner circumferential surface 36 has a central axis 40 coaxial with the central axis 16 of the rotating member 12 positioned therein. Formed within the annular ring 22 are a plurality of apertures 42 into which primary balancing weights 26 are secured in a spaced relationship around the opening 34 to provide an unbalanced annular ring of symmetrical size and shape.

It will be appreciated that the inner circumferential surface 36 of the annular ring 22 may be profiled to conform to the shape of the rotating member 12 positioned therein. For example, the inner circumferential surface 36 of the annular ring 22 may have a truncated conical shape whose diameter gradually decreases from the forward face 30 to the rearward face 32 of the annular ring in a direction of the thickness of the ring.

The apertures 42 of the annular ring 22 are formed, in the example shown, in the forward face 30 of the annular ring and comprise six circumferentially spaced apertures. A primary balancing weight 26 is removably disposed within one or more of the apertures 42 in accordance with the direction of imbalance to be eliminated. In a preferred embodiment, the apertures 42 are threaded and the primary balancing weights 26 are similarly threaded to be screwed and securely retained within the apertures.

Figure 3:
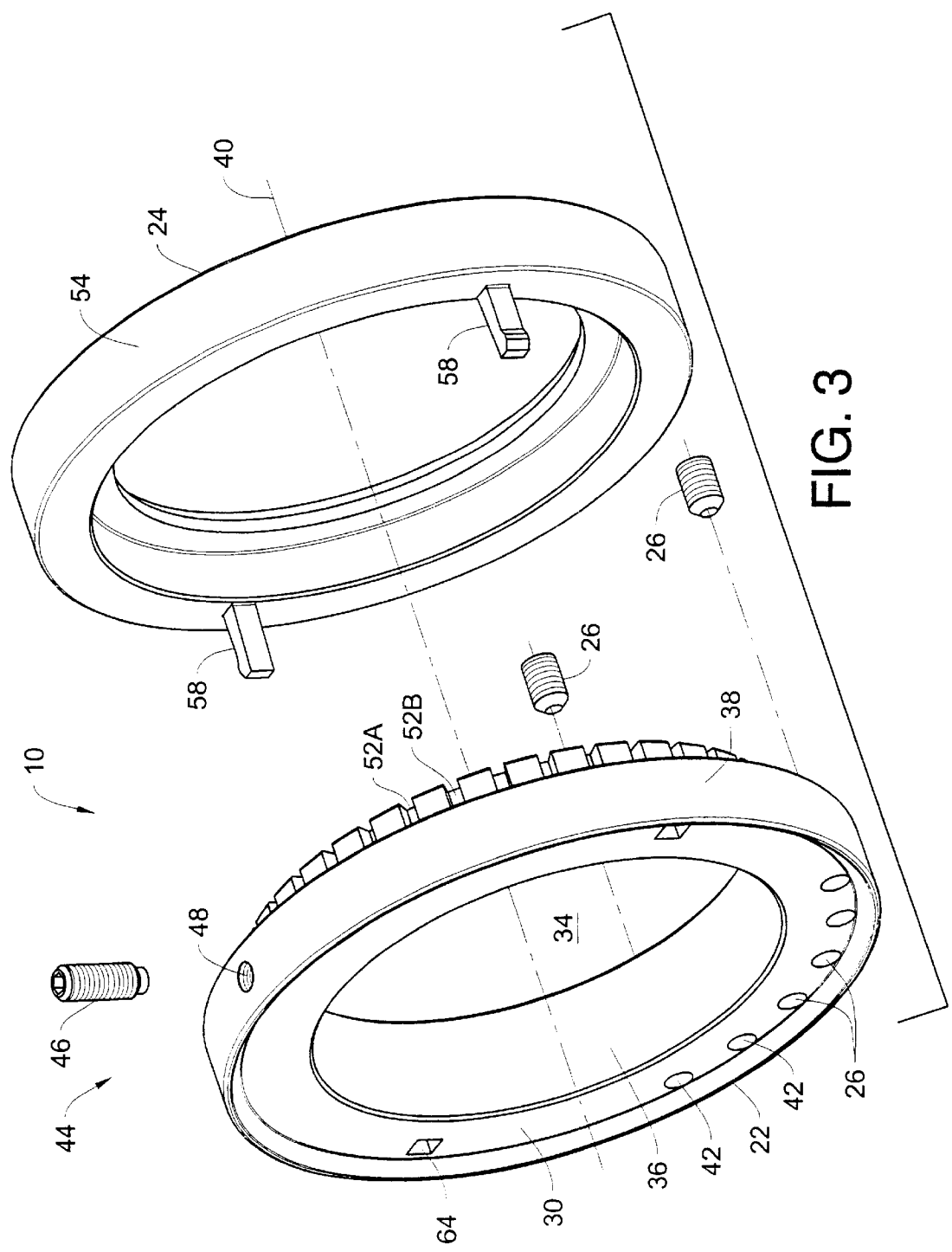
FIG. 3 is an exploded perspective view of the balancing assembly in accordance with the present invention.

To maintain the annular ring 22 fixed with respect to the rotating member 12, the annular ring includes a locking member 44. In a preferred embodiment, the locking member 44 is formed transversely of the opening 34 and all the way through the body of the annular ring. In a preferred embodiment, as shown in FIG. 3, the locking member 44 comprises a set screw 46 that is adapted to thread within a threaded bore 48 within the annular ring 22 to secure the annular ring from rotational movement and maintain the annular ring in a fixed position with respect to the rotating member when tightened against the rotating member. The set screw 46 may be located above a circumferential groove 50 formed within the rotating member 12 as a means for positioning and controlling the axial location of the annular ring 22 with respect to the rotating member. When the set screw 46 is fully threaded within the threaded bore 48 an end of the set screw is located within the groove 50 of the rotating member.

Formed radially about the circumference of the rearward face 32 of the annular ring 22 are a plurality of slots 52. In a preferred embodiment, the slots 52 have an open end 52a and open side 52b for easy access and are equally spaced about the entire circumference of the annular ring 22. The slots 52 extend longitudinally from the rearward face 32 of the annular ring and parallel to the central axis 40 of the annular ring. Alternatively, the slots 52 may extend in directions having angles with respect to the central axis 40, for example, in directions with which they come outwardly or inwardly in radial directions toward the central axis. The slots 52 are configured to accept at least one secondary balancing weight 28. The secondary balancing weight 28 is of a weight different from the primary balancing weight 26 and preferably less than the primary balancing weight. The removable secondary balancing weight 28 may be of most any suitable size and shape to fit within the slot 52. In a preferred embodiment, the secondary balancing weight 28 is capable of being apportioned incrementally into any desired weight. For example, the secondary balancing weight 28 may be of a hardening or nonhardening material having a consistency similar to clay that readily adheres to the slot surface 52. For example, the secondary balancing weight may be mixture of powdered metal and clay or some other substance having a consistency similar to clay. The secondary balancing weight 28 may be apportioned into most any desired amount and added or subtracted to one or more of the slots 52 as desired. It will be appreciated that the secondary balancing weight 28 facilitates fine adjustment of the balancing assembly 10 beyond that obtained by the primary balancing weight 26 alone.

As shown in FIGS. 3, and 7–9, the cover 24 of the balancing assembly 10 is configured to fit over the rearward face 32 of the annular ring 22 and enclose the slots 52 to retain the secondary balancing weights 28 within the slots during rotation of the annular ring.

As shown in FIGS. 7–9, the cover 24 includes a main body member 54 and a radially inwardly projecting flange 56. Extending forwardly from the main body member 54 is a connecting section 58. In a preferred embodiment, the connecting section 58 includes self-aligning finger-like projections 60 having opposing outwardly directed tabs 62 which are received within suitably configured openings 64 formed within the annular ring 22 to removably couple the cover 24 to the annular ring. During high-speed rotation, the balancing assembly 10 will undergo centrifugal loading and the finger-like projections 60 will tend to move radially outwardly thereby maintaining a secure hold on the annular ring 22 without the use of separate mechanical fasteners such as screws, bolts and the like. It will be appreciated that the application of separate mechanical fasteners to couple the cover 24 to the annular ring 22 after the rotating member 12 has been set to a zero net balance state will negatively effect the desired balance of the balancing assembly 10.

The annular ring 22 and cover 24 can be assembled to the rotating member 12, for example, by positioning the annular ring and cover, in this order, onto the rotating member, screwing one or more primary balancing weights 26 within one or more apertures 42 and then locking the annular ring to the rotating member. The rotating member 12 is then rotated and the direction of imbalance and the imbalance amount are measured. Then, the set screw 46 is loosened to such a degree that the annular ring 22 is rotated relative to the rotating member 12. The annular ring 22 may be provided with an indexing mark on its outer edge. In a preferred embodiment, the center of gravity of the annular ring 22 lies on the radial axis of the set screw threaded bore 48 which serves as an indexing mark. The indexing mark is used to position the balancing assembly 10 with respect to the rotating member 12. The annular ring 22 is rotated relative to the measured direction of imbalance to offset the imbalance of the rotating member 12.

Thereafter, the rotating member 12 is rotated and the direction of imbalance and the imbalance amount are measured again. It will be appreciated that there are commercially available machines for determining the imbalance of a rotating member 12 such as a tool holder and cutting tool such as a MT-50 Tool Holder Balancer manufactured by American Hofinann. In determining the imbalance associated with the rotating member 12, there will be both a magnitude imbalance determined and also the angular position of that magnitude imbalance will be determined. Next, one or more secondary balancing weights 28 may be added to the slots 52 to fine tune the balance of the rotating member 12. Finally, the cover 24 is coupled to the annular ring 22 to maintain the secondary balancing weights 28 in position.

It will be appreciated that the annular ring 22 and the cover 24 may also be coupled loosely with each other in advance and secured to the rotating member 12 as described above. In a condition where the annular ring 22 and the cover 24 are assembled to the rotating member 12 as described above, there is no possibility that the annular ring and cover may move relative to each other, and accordingly, loosening of the balancing assembly 10 is prevented.

The balancing assembly 10 of the present invention can be incorporated into any rotating member 12 including a rotating cutting tool holder as shown in the figures or can be retrofitted into an existing rotating cutting tool holder. In this regard, many cutting tool manufacturers design rotating cutting tools such that the size of certain portions of the tool assembly conform to or fall within an industry standard tool envelope such as set by ANSI or ISO. Typically, the area of concern (i.e. the area to which the standard applies) is that area of the tool holder, as viewed in FIG. 1, extending forwardly from the balancing assembly. This enables conforming tool assemblies to be interchangeable.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A balancing assembly for balancing a rotating member, the balancing assembly comprising:
    an annular ring having an opening for receiving the rotating member, the annular ring including at least one removable primary balancing weight and at least one removable secondary balancing weight,
    a locking member to secure the annular ring with respect to the rotating member; and
    a cover for operatively containing the at least one secondary balancing weight with respect to the annular ring, the cover including a means for coupling the cover to the annular ring when the balancing assembly undergoes centrifugal loading.

2. The balancing assembly of claim 1 wherein the annular ring includes a plurality of apertures, wherein one or more of the apertures having secured therein at least one of the primary balancing weights.

3. The balancing assembly of claim 2 wherein the plurality of apertures are circumferentially spaced from each other around the opening.

4. The balancing assembly of claim 3 wherein the annular ring includes a forward side and a rearward side, wherein the apertures are formed in the rearward side of the annular disk at six equally circumferentially spaced locations.

5. The balancing assembly of claim 4 wherein each aperture is threaded to receive a complimentary threaded primary weight.

6. The balancing assembly of claim 1 wherein the opening of the annular ring defines an inner circumferential surface and an outer circumferential surface, the inner circumferential surface of the annular ring is profiled to conform to the shape of the rotating member positioned therein.

7. The balancing assembly of claim 6 wherein the inner circumferential surface of the annular ring is of a truncated conical shape.

8. The balancing assembly of claim 1 wherein the locking member is formed transversely of the opening and through the annular ring.

9. The balancing assembly of claim 8 wherein the locking member is a set screw and threaded bore configured to receive the set screw to secure the annular ring from rotational movement and maintain the annular ring in a fixed position with respect to the rotating member.

10. The balancing assembly of claim 9 wherein the rotating member includes a groove such that the set screw is positioned within the groove as a means for positioning and controlling the axial movement of the annular ring with respect to the rotating member.

11. The balancing assembly of claim 10 wherein the annular ring includes a plurality of slots.

12. The balancing assembly of claim 11 wherein the slots are formed radially about the circumference of a rearward face of the annular ring.

13. The balancing assembly of claim 12 wherein the slots are equally spaced about the circumference of the annular ring.

14. The balancing assembly of claim 11 wherein the slots extend longitudinally from a rearward face of the annular ring.

15. The balancing assembly of claim 1 wherein the at least one secondary balancing weight is of a hardening or non-hardening material having a consistency such that the at least one secondary balancing weight will adhere to the annular ring.

16. The balancing assembly of claim 1 wherein the at least one secondary balancing weight is clay.

17. The balancing assembly of claim 1 wherein the cover is of an L-shape cross section.

18. The balancing assembly of claim 17 wherein the cover includes a main body member and a radially inwardly projecting flange.

19. The balancing assembly of claim 18 wherein the means for coupling the annular ring and the main body member includes a connecting section including finger-like projections in the main body member having outwardly extending tabs which are received within slots in the annular ring to retain the cover against the annular ring.

20. A combination of a rotating member and a balancing assembly for balancing the rotating member comprising:
    a rotating member
    an annular ring having an opening for receiving the rotating member, the annular ring including at least one removable primary balancing weight and at least one removable secondary balancing weight,
    a locking member to secure the annular ring with respect to the rotating member; and
    a cover for operatively containing the at least one secondary balancing weight with respect to the annular ring, the cover including a means for coupling the cover to the annular ring when the balancing assembly undergoes centrifugal loading.

21. The combination of claim 20 wherein the annular ring includes a plurality of apertures, wherein one or more of the apertures having secured therein at least one of the primary balancing weights.

22. The combination of claim 21 wherein the plurality of apertures are circumferentially spaced from each other around the opening.

23. The combination of claim 22 wherein the annular ring includes a forward side and a rearward side, wherein the apertures are formed in the rearward side of the annular disk at six equally circumferentially spaced locations.

24. The combination of claim 23 wherein each aperture is threaded to receive a complimentary threaded primary weight.

25. The combination of claim 20 wherein the opening of the annular ring defines an inner circumferential surface and an outer circumferential surface, the inner circumferential surface of the annular ring is profiled to conform to the shape of the rotating member positioned therein.

26. The combination of claim 25 wherein the inner circumferential surface of the annular ring is of a truncated conical shape.

27. The combination of claim 20 wherein the locking member is formed transversely of the opening and through the annular ring.

28. The combination of claim 27 wherein the locking member is a set screw and threaded bore configured to receive the set screw to secure the annular ring from rotational movement and maintain the annular ring in a fixed position with respect to the rotating member.

29. The combination of claim 28 wherein the rotating member includes a groove such that the set screw is positioned within the groove as a means for positioning and controlling the axial movement of the annular ring with respect to the rotating member.

30. The combination of claim 29 wherein the annular ring includes a plurality of slots.

31. The combination of claim 30 wherein the slots are formed radially about the circumference of a rearward face of the annular ring.

32. The combination of claim 31 wherein the slots are equally spaced about the circumference of the annular ring.

33. The combination of claim 30 wherein the slots extend longitudinally from a rearward face of the annular ring.

34. The balancing assembly of claim 20 wherein the at least one secondary balancing weight is of a hardening or nonhardening material having a consistency such that the at least one secondary balancing weight will adhere to the annular ring.

35. The combination of claim 20 wherein the at least one secondary balancing weight is clay.

36. The combination of claim 20 wherein the cover is of an L-shape cross section.

37. The combination of claim 36 wherein the cover includes a main body member and a radially inwardly projecting flange.

38. The balancing assembly of claim 37 wherein the means for coupling the annular ring and the main body member includes a connecting section including finger-like projections in the main body member having outwardly extending tabs which are received within slots in the annular ring to retain the cover against the annular ring.

* * * * *